US008412540B2

(12) United States Patent
Erdmann et al.

(10) Patent No.: US 8,412,540 B2
(45) Date of Patent: *Apr. 2, 2013

(54) HEALTHCARE ELIGIBILITY TRANSACTIONS

(75) Inventors: Jeffrey Jay Erdmann, Richfield, WI (US); Steven T. Brown, Franklin, WI (US); Joanne E. Gruchalski, Franklin, WI (US); Rosanne Marie Butkowski, New Berlin, WI (US); Douglas Luther Norman, Brookfield, WI (US); Henry Anthony Widenski, Jr., Pewaukee, WI (US); Jimmie Lindsey, Milwaukee, WI (US); Greg Leininger, Germantown, WI (US); Mark Andrew Neuville, De Pere, WI (US); Daniel L. Perry, West Allis, WI (US)

(73) Assignee: Alegeus Technologies, LLC, Waltham, MA (US)

( * ) Notice: Subject to any disclaimer, the term of this patent is extended or adjusted under 35 U.S.C. 154(b) by 25 days.

This patent is subject to a terminal disclaimer.

(21) Appl. No.: 12/893,609

(22) Filed: Sep. 29, 2010

(65) Prior Publication Data
US 2011/0106570 A1    May 5, 2011

Related U.S. Application Data

(63) Continuation of application No. 11/460,208, filed on Jul. 26, 2006, now Pat. No. 7,822,624.

(51) Int. Cl.
*G06Q 10/00* (2006.01)
*G06Q 50/00* (2012.01)
(52) U.S. Cl. .................... 705/2; 705/3; 235/375
(58) Field of Classification Search .............. 235/375, 235/380, 383; 340/572.1; 705/22, 24, 26, 705/2–4
See application file for complete search history.

(56) References Cited

U.S. PATENT DOCUMENTS

| 2003/0009355 | A1* | 1/2003 | Gupta .............................. 705/2 |
| 2005/0015280 | A1* | 1/2005 | Gabel et al. ...................... 705/2 |

* cited by examiner

*Primary Examiner* — Michelle Le

(57) ABSTRACT

Methods and systems permit registration of a service provider and permit eligibility information to be provided to the service provider. Registration information is received over a financial network from a point-of-sale terminal. The registration information has an identifier associated with the point-of-sale terminal and an identification of the service provider. The identifier is associated with information identifying a device disposed at a location of the service provider in a database, permitting a communication path to the device to be established. A confirmation of registration of the point-of-sale terminal is transmitted to the device over the communication path.

24 Claims, 13 Drawing Sheets myHealthcare Company

Subscriber Name:
  JOHN SMITH

Group:
  MID CONTINENT AIRLINES

Group No.:
  98765

Primary Care Physician:
  MARY JONES

PCP Telephone No.:
  (212) 555-1234

| | |
|---|---|
| Office Visit: | $15 |
| Hospital Outpatient: | $15 |
| Emergency Room: | $50 |
| Hospital Inpatient: | $500 |
| O/P Surgery Facility: | $75 |
| O/P Surgery Physician: | $200/20% |
| O/P Mental Health: | 10% |
| Rx (Pharmacy): | $5/$10 |
| Ambulance: | |
| Member Deductible: | $100 |
| Family Deductible: | $300 |

Fig. 4A

Subscriber Service:
  (800) 555-1000

For Coverage While Traveling:
  (800) 555-2000

Precertifications:
  (800) 555-2000

Mail Claims to:

myHealthcare Company
1492 West Rock Place
Anywhere, NY 12345 http://www.myHealthcare.com

Fig. 4B

HEALTHCARE ELIGIBILITY TRANSACTIONS

CROSS REFERENCE

This application is a continuation of, and claims the benefit of U.S. application Ser. No. 11/460,208, entitled "Healthcare Eligibility Transactions," filed Jul. 26, 2006, the entire disclosures of which are incorporated herein by reference for all purposes.

BACKGROUND OF THE INVENTION

This application relates generally to healthcare transactions. More specifically, this application relates to healthcare eligibility transactions.

The financial structure of the healthcare system in the United States provides a good example of a more general class of systems that rely on eligibility information when providing services. The healthcare model is structured around three principal parties: a patient, a healthcare provider, and an insurer. In a typical arrangement, services provided by the healthcare provider to the patient are paid for by the insurer. This may be subject to a variety of conditions depending on the specific type of the service and may be subject to a requirement that the patient make a contribution towards the cost. For instance, certain high-cost procedures frequently require some form of preapproval by the insurer before the service is provided; this gives the insurer an opportunity to confirm the medical necessity of the procedure before it is performed and the cost incurred. The contribution towards the cost made by the patient is frequently referred to in the art as a "copay," which is a truncation of the complete term "copayment."

The eligibility of a patient for certain services may depend on the particular insurance coverage provided by the insurer, with coverage details varying among insurance plans, among different patient employers, and sometimes even among different patients. If a particular patient is not eligible for certain service, alternative arrangements must be made because the healthcare provided cannot expect to receive subsequent payment for the service from the insurer. When a patient visits a healthcare provider, there thus needs to be some mechanism to verify the eligibility of the patent for certain services pursuant to an insurance agreement. Eligibility has traditionally been verified by obtaining insurance information from the patient, with staff of the healthcare provider confirming the information with the insurer and checking eligibility for services by telephone. Such a process is generally time-consuming for the staff, resulting in inefficiencies in the operation of a healthcare practice.

There is accordingly a need in the art for improved methods and systems of verifying eligibility for services.

BRIEF SUMMARY OF THE INVENTION

Embodiments of the invention provide methods and systems for registering a service provider to receive eligibility information and for providing the eligibility information to the service provider. The eligibility information indicates the eligibility of a subscriber to receive a service from the service provider in accordance with a policy of a third party; the third party is different from the service provider and different from the subscriber. One specific example of such an arrangement occurs when the service provider is a healthcare provider and the third party is an insurer, although other arrangements may occur in other embodiments.

Methods of the invention comprise receiving registration information over a financial network from a point-of-sale terminal. The registration information includes a first identifier associated with the point-of-sale terminal and an identification of the service provider. The first identifier is associated with information identifying a device disposed at a location of the service provider in a database. The device is different from the point-of-sale terminal. A communication path to the device is established with the information identifying the device. A confirmation of registration of the point-of-sale terminal is transmitted to the device over the communication path.

In some embodiments, the financial network comprises an ATM network. A portion of the registration information that includes the identification of the service provider may have been extracted from a registration instrument read by the point-of-sale terminal, such as when the registration instrument comprises a magnetic-stripe card. A web site may sometimes be established for managing eligibility information for the service provider with secure access by the service provider. Examples of the device include a fax machine, in which case the communication path may include the public-telephone switch network, or a computational device, in which case the communication path may include the Internet.

Providing the eligibility information may be prompted by receiving an authorization request over the financial network from the point-of-sale terminal. The authorization request includes the first identifier and a second identifier associated with a subscriber. Eligibility information is retrieved from a data store using the second identifier. The eligibility information indicates eligibility of the subscriber to receive a service from the service provider in accordance with a policy of a third party different from the service provider and different from the subscriber. The eligibility information is then transmitted to the service provider.

In one embodiment, a response to the authorization request is transmitted over the financial network to the point-of-sale terminal. For instance, the authorization request might include a nominal transaction amount, with the response comprising a decline code that indicates a refusal of the authorization request. Alternatively, the authorization request might include a zero transaction amount, with the response comprising an approval code that indicates an approval of the authorization request.

In another embodiment, the information identifying the device is retrieved from the database. A second communication path to the device is established with the information identifying the device, and the eligibility information is transmitted over the second communication path to the device.

In specific embodiments, the service provider may be a healthcare provider and the third party may be an insurer. In some instances, the second identifier comprises an identifier extracted from a presentation instrument issued to the subscriber, one example of such a presentation instrument being a magnetic-stripe card.

The methods of the invention may be embodied in a system having a communications device, a processor, a storage device, and a memory coupled with the processor. The memory comprises a computer-readable medium having a computer-readable program embodied therein for directing operation of the system. The computer-readable program includes instructions for operating the system in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIGS. 4A and 4B show front and back sides of an example of an eligibility card that may be used with embodiments of the invention;

DETAILED DESCRIPTION OF THE INVENTION

Embodiments of the invention provide a structure that simplifies verification of eligibility in transactions where a service provider may make performance of a service contingent on establishing the eligibility of the recipient of the service to receive it. In the description that follows, this is illustrated within the context of healthcare transactions, although that specific context is not a requirement of the invention. Other embodiments may implement eligibility transactions as an adjunct to the execution of services other than healthcare services.

As used herein, the term "eligibility transaction" refers to a transaction that establishes the eligibility of a potential or actual service recipient to the service. Such eligibility transactions may take a variety of forms. For example, verification that an individual is eligible for a specified service is a form of an eligibility transaction. Retrieval of a partial or complete list of services that an individual is eligible to receive from a specified service provider is another form of eligibility transaction. In some instances, the eligibility transaction may additionally include a variety of different types of supplemental information such as definitions of services, copay amounts, reimbursement procedures, and the like.

Figure 1:
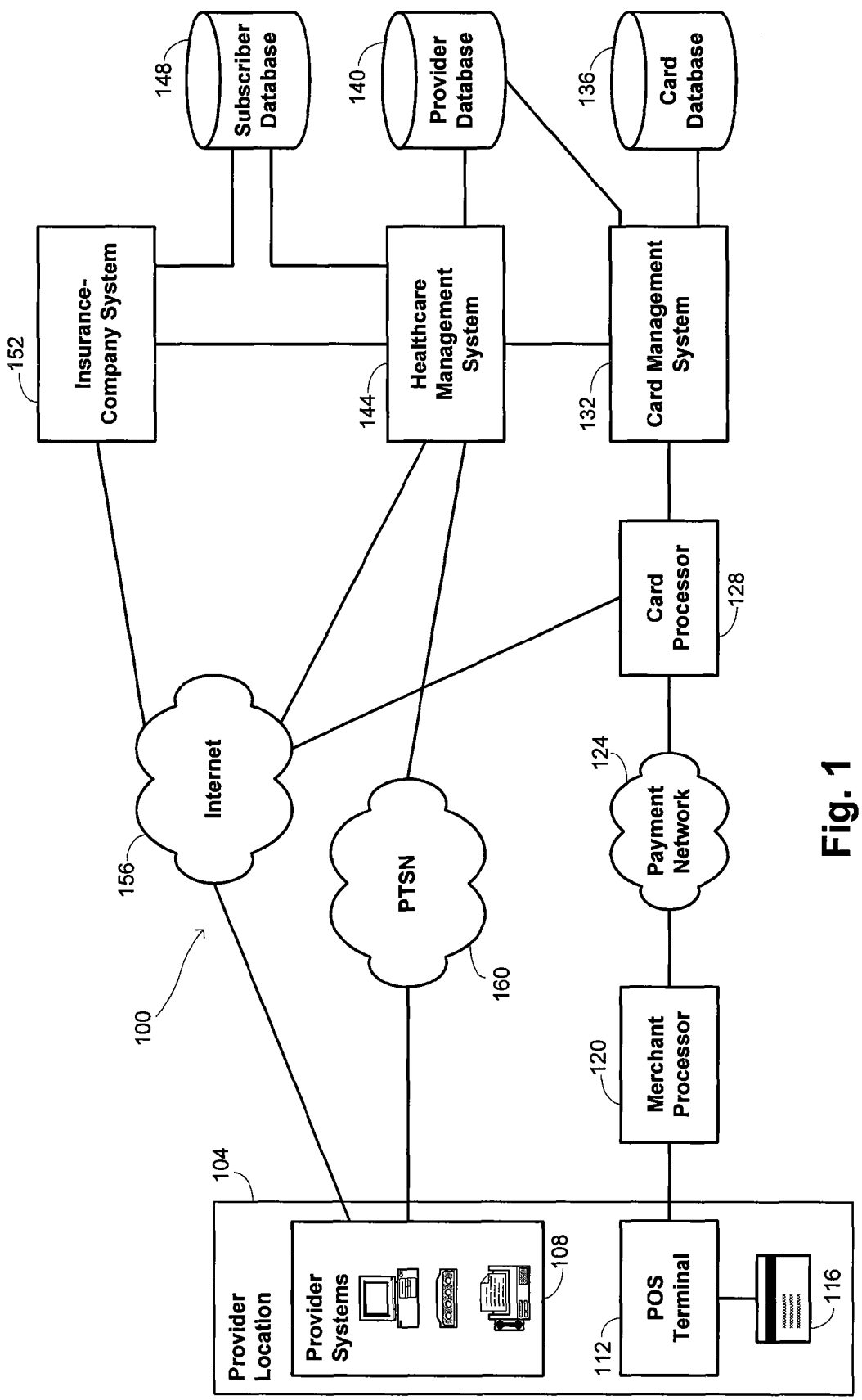
FIG. 1 is a schematic diagram illustrating an architecture that may support embodiments of the invention.

A general overview of an architecture that may be used in executing eligibility transactions is provided schematically in FIG. 1. The service provider has a provider location 104, at which may be disposed one or more devices that are used to interact with other components of the architecture 100. While it is generally the case that the service being provided will occur at the provider location 104, there may be other instances is which there is some separation between the provider location 104 that includes equipment for interfacing with the architecture 100 and other service locations.

Examples of a variety of different communications devices that may be disposed at the provider location 104 are shown in the drawing. Generally, one or more of such devices comprises a point-of-sale terminal 112 equipped to read information from a presentation instrument 116. For instance, the presentation instrument 116 may be a magnetic-stripe card, with the point-of-sale terminal 112 comprising a magnetic-stripe reader. Other types of presentation instruments 116 may include chip cards, cards with bar codes, or a variety of radio-frequency devices in the form of cards, fobs, and the like, with the point-of-sale terminal 112 having corresponding equipment to read the presentation instrument. In some embodiments, the point-of-sale terminal 112 comprises a multifunction terminal that has the capability of reading different types of presentation instruments 116, thereby providing flexibility to service recipients in the type of instruments they carry.

The point-of-sale terminal 112 is used to provide information to the remaining part of the architecture 100 and may also be used in some embodiments to receive information from the remaining part of the architecture 100. The other devices 108 shown in the drawing at the provider location 104 are also generally capable of two-way communication with the architecture 100, but in some embodiments are used exclusively to receive information when used in the execution of an eligibility transaction. One example of a device that may be included is a fax machine that has a connection with the public-telephone switch network ("PTSN") 160. Other examples of devices that may be included are any of a variety of computational devices that include connections with the Internet 156, such as desktop computers, laptop computers, personal digital assistants, and the like. As will be evident from the remaining description, the PTSN 160 and the Internet 156 may also be provided in communication with other components of the architecture 100 to enable the desired exchange of communications.

In certain embodiments, significant portions of the architecture used to support eligibility transactions are the same as existing architectures used in supporting a variety of financial transactions, such as credit transactions, debit transactions, and the like. In such embodiments, the existence of the financial-transaction architecture is exploited to enable the execution of eligibility transactions with only modest modifications to the architecture. Such an example is illustrated in FIG. 1, in which the point-of-sale terminal 112 is provided in communication with a merchant processor 120. The merchant processor 120 is a computational device traditionally used by merchants for the exchange of financial-transaction information as an adjunct to performing sales of goods and/or services.

The merchant processor 120 is provided in communication with a card processor 128 over a payment network 124. The card processor 128 is a computational device that is traditionally used in coordinating approvals or denials of requested financial transactions transmitted by merchants. It performs these traditional functions in the context of credit or debit transactions by receiving information transmitted by the merchant from a point-of-sale terminal over the payment network 124 that defines aspects of the financial transaction. This information may include an amount of the transaction, an identification of the merchant, and an identification of a card presented by a customer to support the financial transaction, in addition to various other pieces of information. The card processor 128 analyzes the information to verify the validity of the presented card, such as by ensuring that it provides a valid bank identification number ("BIN").

In some embodiments, the payment network 124 comprises an ATM network. As referred to herein, such a network comprises connections to a plurality of point-of-sale devices and to financial institutions and may be used to route transaction information for executing debit transactions originating at the point-of-sale devices and supported by accounts maintained by the financial institutions. The acronym "ATM" is a historical reference to an "automatic teller machine." While the ATM network may include connections with automatic teller machines, it more generally includes connections to other devices that may be used in support of debit transactions.

Upon confirming the validity of the card information, the card processor 128 transmits the information to a card-management system 132 that compares details of the financial transaction with the terms of the credit or debit status of an account identified by the transmitted information. For instance, if the card information identifies an account having a certain credit limit and a current balance, an approval code may be generated if the transaction amount is less than the different between the credit limit and the current balance. Similarly if the card information identifies a debit account having a certain balance, an approval code may be generated if the transaction amount is less than the balance. In other instances, a denial code may be generated. This process is aided by providing the card-management system 132 with access to a card database 136 that stores information relevant to the process. For instance, the card database 136 may store card numbers for subscribers and an indication of the status of individual presentation instruments. In such traditional uses of this portion of the architecture 100, the approval or denial code is transmitted back to the point-of-sale terminal 112, which displays information permitting the merchant to take appropriate action in accepting or refusing to execute the financial transaction.

The payment network 124 is generally a private network that includes a variety of security features to protect the sensitive nature of the information being exchange over it. These security features may implement any of a variety of techniques well known to those of skill in the art, including various encryption schemes, the use of identifying passwords that must be supplied by the point-of-sale terminal, and the like.

Embodiments of the invention extend this financial-transaction use of this portion of the architecture 100 by including a mechanism for communication between the card-management system 132 and a healthcare management system 144. The healthcare-management system 144 is a computational device that includes software for implementing healthcare functions. It is interfaced with a provider database 140 that includes information relating to multiple healthcare providers that may participate in the eligibility functions, and is interfaced with a subscriber database 148 that includes information relating to subscribers to healthcare-insurance programs. For instance, the provider database 140 may include information that identifies each of the providers, together with contact information in the form of an address, a telephone number, a fax number, and email address, and the like. In addition, the provider database 140 may indicate what types of services are offered by each of the providers. Access to the subscriber database 148 is shared with an insurance-company system 152, which is a computational system that implements functionality for an insurer. In many instances, the ability to make updates to the subscriber database 148 is reserved to the insurance-company system 152, with the healthcare-management system 144 merely being provided with read access to permit information to be retrieved in implementing the eligibility functions. Access to the provider database 140 is shared with the card-management system 132, which may use the provider database 140 in performing validation functions described below.

In different embodiments, the card processor 128, the card-management system 132, and the healthcare-management system 144 may be operated by different entities or may be operated by a single entity. Certain embodiments described below are directed to instances in which their operation is managed by a single entity, referred to herein as a "coordinator."

Each of the computational systems in this architecture may include connections as appropriate with the PTSN 160 and/or the Internet 156. In the illustration of this particular embodiment, connections are shown to the Internet 156 by each of the insurance-company system 152, the healthcare management system 144, and the card processor 126, and connections are shown to the PTSN by the healthcare-management system 144. This reflects a particular implementation that enables certain types of access to these various systems to be given to the providers and/or to the subscribers. For instance, access may be provided to permit subscribers to perform checks of the status of healthcare accounts maintained with the insurance company, to check the progress of processing submitted claims, to check the consideration of appeals, and the like. Similarly, access may by given to providers to enter information updates regarding the scope of their practices, to check on claims processing, and the like. In other embodiments that implement different access arrangements for providers and subscribers, different connections among the various systems with the PTSN 160 and/or Internet 156 may be used.

Figure 2:
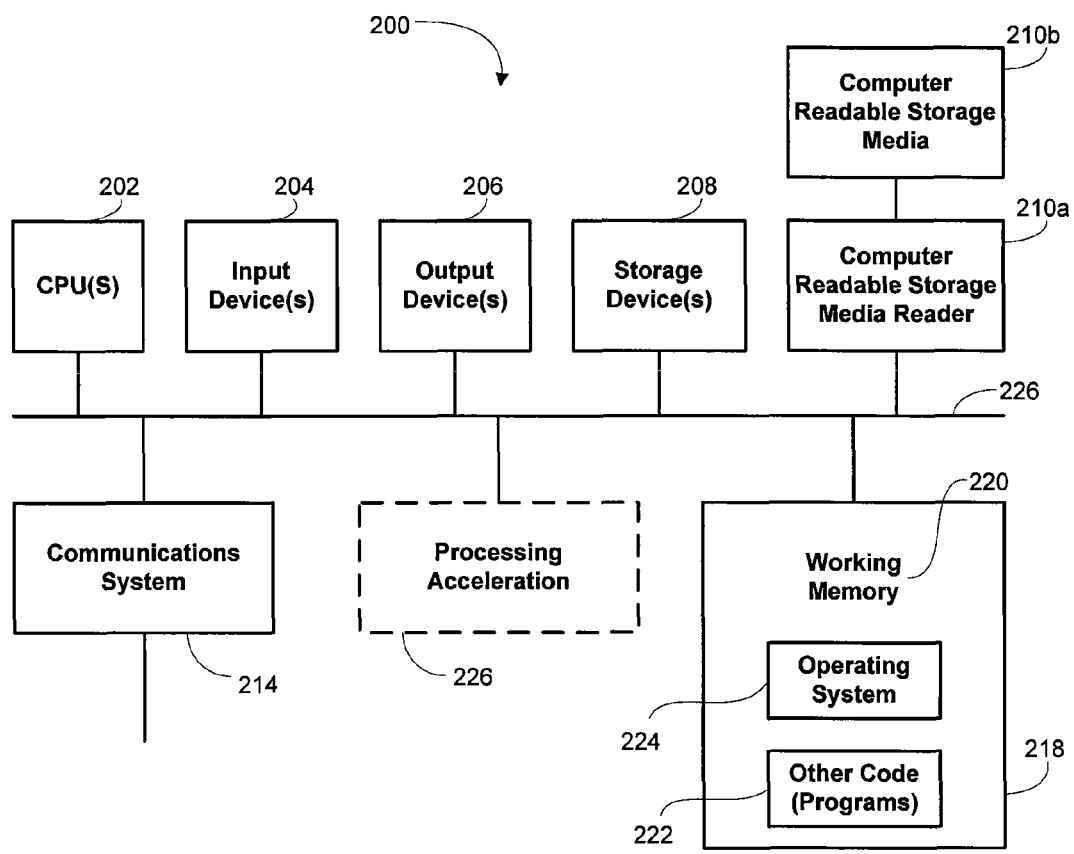
FIG. 2 is a schematic diagram of computational devices that may be comprised by the architecture of FIG. 1 and used to implement certain methods of the invention.

FIG. 2 provides a schematic illustration of a structure that may be used to implement any of the computational devices used in the architecture 100, including the merchant processor 120, the card processor 128, the card-management system 132, the healthcare-management system 144, and the insurance-company system 152. Such computational units are denoted generically by reference number 200 in FIG. 2, which broadly illustrates how individual system elements may be implemented in a separated or more integrated manner. The computational device 200 is shown comprised of hardware elements that are electrically coupled via bus 226, including a processor 202, an input device 204, an output device 206, a storage device 208, a computer-readable storage media reader 210*a*, a communications system 214, a processing acceleration unit 216 such as a DSP or special-purpose processor, and a memory 218. The computer-readable storage media reader 210*a* is further connected to a computer-readable storage medium 210*b*, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged over the architecture 100 described in connection with FIG. 1.

The computational device 200 also comprises software elements, shown as being currently located within working memory 220, including an operating system 224 and other code 222, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 3:
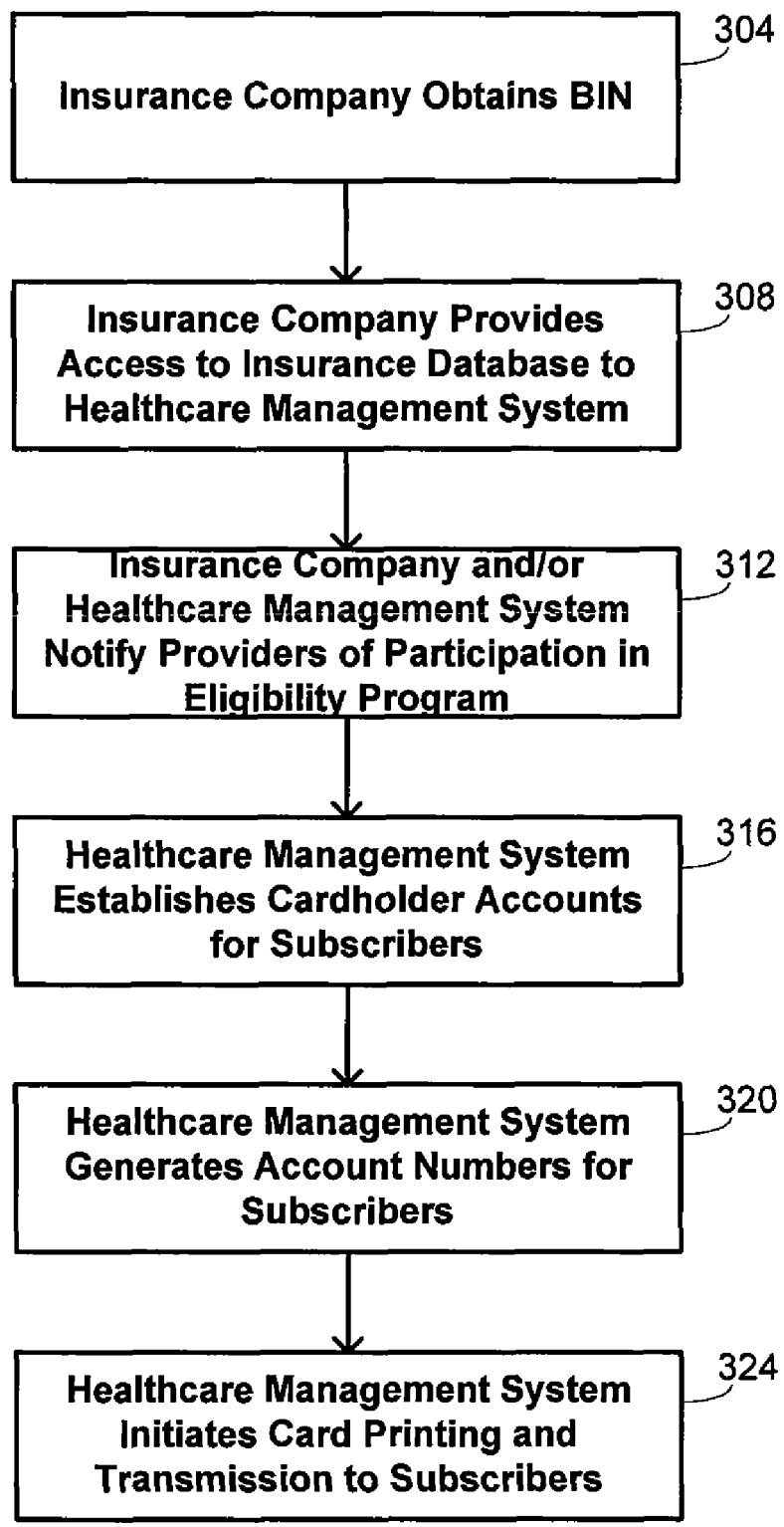
FIG. 3 is a flow diagram summarizing methods of initiating an eligibility-transaction program in certain embodiments of the invention.

FIG. 3 is a flow diagram that summarizes aspects of methods used to initiate an eligibility transaction program that uses the architecture 100 of FIG. 1. Initiation of such a program may require that an insurance company that wishes to participate obtain a BIN, as indicated at block 304. The establishment of a BIN for the insurance company provides the type of identification that is customary on those portions of the architecture 100 traditionally used for processing financial transactions. Particularly in embodiments where the coordinator also acts to coordinate the processing of financial transactions, it may provide assistance to the insurance company in obtaining the BIN. In such embodiments, the coordinator generally has experience with the application process and licensing requirements, and is therefore in a good position to provided assistance.

As indicated at block 308, the insurance company provides access to one or more insurance databases to the healthcare management system 144. This may result, for instance, in the ability for the healthcare management system 144 to access the subscriber database 148 as shown in FIG. 1 after access is provided. Notification of participation by the insurance company in the eligibility transaction program is provided to the providers at block 312. While notification may be initiated to each of the provider by either the insurance-company system 152 or by the healthcare-management system 144, it is generally anticipated that notification will be more often initiated by the healthcare-management system 144—it may be involved in the initiation of the eligibility transaction system for a number of different insurers and may have standard notification information available.

There are a variety of mechanisms that may be used to effect the notifications. For instance, postal addresses of the providers may be retrieved from the provider database 140, with notifications being provided by a bulk mailing program. Other notification mechanisms include provided notifications by telephone over the PTSN 160, providing notifications by fax over the PTSN 160, providing notifications by email over the Internet 156, and the like. Some of the providers may already have been participating in the eligibility transaction program with other insurers; the notifications to those providers may take the form of an update of insurers that participate in the program. For other providers, this may represent the first time that they are able to participate in the program, in which case they may prefer to receive more comprehensive information describing the objectives and implementation of the program.

In addition to notifying providers, steps are also taken to notify subscribers and to integrate them into the management of the system. Thus, at block 316, the healthcare-management system 144 establishes cardholder accounts for each of the subscribers identified in the subscriber database 148. These accounts are generally maintained by the healthcare-management system 144 and are identified by account numbers that are generated at block 320. With the accounts having been established, generation of the eligibility presentation instruments is initiated by the healthcare-management system 144 at block 324. Some flexibility may be afforded in the specific design of the presentation instruments, particularly to reflect designs or features preferred by the insurer. This may be done by receiving design information from the insurer and integrating it with the generation of the presentation instruments. In some instances, the insurer may additionally request that inserts or other information be included with the presentation instruments when they are transmitted to the subscribers.

Having established the subscriber accounts and notified providers of the inclusion of the insurer in the program, the healthcare-management system 144 is prepared to implement various levels of functionality. The specific functions performed may vary in different embodiments and a capacity may be provided to vary the functionality for different insurers, for different providers, and even for different subscribers. Briefly, the healthcare-management system 144 acts to record and track data about transactions executed with the presentation instruments, permitting a variety of different types of information to be extracted when desired. For instance, the healthcare-management system 144 may provided a comprehensive set of inquiry and maintenance functions in different embodiments. It may generate reports for the insurer and/or providers listing customer activity, fie maintenance, and statistical and management information Access may be provided to individual subscriber transaction histories.

The healthcare-management system 144 may also provide a variety of administrative functions, permitting the insurers and/or providers to tailor how they interact with the system. For instance, facilities may be provided to define expiration and reissue cycles for the presentation instruments, as well as facilities for enrolling new subscribers. A variety of search mechanisms may be provided to permit insurers and/or providers to review information. Various help interfaces may be provided to assist the insurers and/or providers in navigating the functionality that is offered. FIG. 1 shows an embodiment in which the insurers and providers are given access to such information and functionality over the Internet 156. Usually, this will be in the form of a linked hypertext arrangement of web pages that may be used by the insurers and/or providers in obtaining access. Access to the web pages may be controlled through the use of a userid/password system or through other access mechanisms known to those of skill in the art.

FIGS. 4A and 4B provide an exemplary illustration of a presentation instrument that takes the form of a magnetic-stripe card, with FIG. 4A showing a front of the card and FIG. 4B showing a back of the card. The information actually used in performing an eligibility transaction is generally encoded as part of the track-2 data on the magnetic stripe, so the printing on the card may be used to provide whatever information is desired. In the example provided in FIGS. 4A and 4B, the printing is used to summarize identification information and aspects of eligibility information. For instance, the front of the card shown in FIG. 4A includes the name of the subscriber to whom it is issues, as well as a group number that may be used in identifying the subscriber's account. A provider is also identified in the form of a primary care physician, with contact information being specified for the primary care physician. A summary of copay amounts for different types of services on the right hand side of the card acts as an indication of the types of services the subscriber is eligible to receive. While the front of the card includes information that identifies the subscriber and a provider, the back of the card shown in FIG. 4B has information that identifies the insurer.

Figure 5:
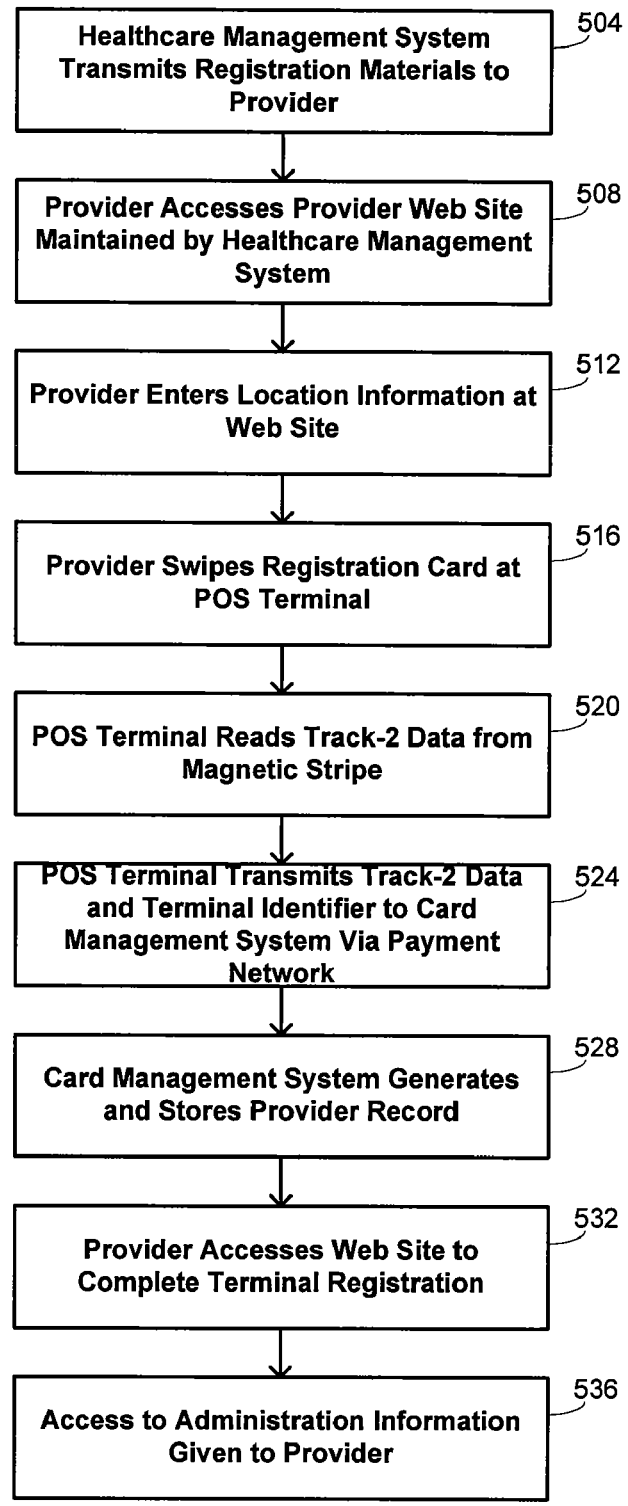
FIG. 5 is a flow diagram summarizing methods of initiating a provider to participate in the eligibility-transaction program.

Although the provider may have been notified of the potential to participate in the eligibility transaction program as part of executing the method of FIG. 3, it may still be necessary to configure the equipment disposed at the provider location 104 to interact with the architecture in implementing the program. FIG. 5 is a flow diagram that summarizes methods for initiating a provider to participate in the program. Such initiation may begin with transmission of registration materials to the provider at block 504. Such transmission may sometimes be part of the notification provided at block 312 of FIG. 3, but may alternatively be performed separately. In other instances, the notification provided at block 312 of FIG. 3 may have instructed the provider to request registration materials through an online or telephone interface, with the materials then being mailed in response to the request.

In one embodiment, the registration materials include written training materials, a registration instrument, and a userid/ password combination assigned to the provider. The registration instrument is generally of the same form as the presentation instruments that will be used in performing eligibility transactions. For example, if the presentation instruments comprise magnetic-stripe cards, the registration instrument may also comprise a magnetic stripe card.

The provider begins the registration by accessing a provider web site maintained by the healthcare-management system 144 over the Internet 156 at block 508. This web site may have been previously set up for the provider by the healthcare-management system 144 and acts as a principal interface through which the provider interacts with the system. Access to the system may be had by entering the userid/password combination provided with the registration materials. As indicated at block 512, the provider enters location information to identify a specific location to be registered. In some cases, multiple locations may be registered sequentially by repeating the process outlined in FIG. 5

At block 516, the provider presents the registration card in the same fashion that an eligibility instrument would be presented as part of an eligibility transaction. For instance, if the registration instrument comprises a magnetic-stripe card, the card may be swiped at a point-of-sale terminal 112, which then reads the track-2 data from the magnetic stripe at block 520. A similar procedure may be followed for different types of presentation instruments in embodiments where they are used.

At block 524, the point-of-sale terminal transmits the retrieved data and a terminal identifier to the card-management system 132 via the payment network 124 and through the merchant processor 120. The terminal identifier is a string that uniquely identifies the point-of-sale terminal 112, which is generally configured to include the identifier with all transaction information as part of executing a transaction. The card-management system 132 uses the information transmitted from the point-of-sale terminal 112 to generate a provider record that associates the provider location 104 and point-of-sale terminal 112 with that provider. This information is then available for subsequent use in identifying the provider during eligibility transactions. To complete the registration, the provider again accesses the web site at block 532, at which point the system authorizes the provider to have access to the provider administrative capabilities at block 536. In some instances, the provider may supply information that identifies the other devices at the provider location 104 in the form of an email address, a fax number, or the like, with the healthcare-management system 144 returning a confirmatory message to the identified devices.

Once a provider is registered and subscribers have been issued presentation instruments, the architecture 100 may be used in the execution of eligibility transactions. There are a variety of different ways in which the eligibility transactions may be performed in different embodiments. Several of these ways are summarized in the flow diagram of FIG. 6, and other methods for executing eligibility transactions will be evident to those of skill in the art after reading this description.

When a subscriber visits a provider location to request services, the provider may ask the subscriber to present his presentation instrument at block 604. The provider may sometimes use the information printed on the presentation instrument to update local records or the like, and initiates the eligibility transaction by presenting the instrument to the point-of-sale terminal 112 at block 608. In the case where the presentation instrument comprises a magnetic-stripe card, this comprises swiping the magnetic stripe through a reader comprised by the point-of-sale terminal 112. The point-of-sale terminal 112 responds by reading information from the presentation instrument to identify a BIN and subscriber account number and generates an authorization request for transmission to the merchant processor 120 at block 612.

The authorization request includes the BIN, the subscriber account number, the point-of-sale identifier, and a transaction amount. In different embodiments, the processing of which is described in greater detail below, the transaction amount may be zero or nonzero; usually in cases where the transaction amount is nonzero, it is a nominal amount, such as $0.01. Embodiments that use a nonzero amount are sometimes referred to herein as "nominal purchase" transactions and embodiments that use a zero amount are sometimes referred to herein as "eligibility verification" transactions. This distinction reflects the different ways in which the financial-transaction parts of the infrastructure 100 are used in performing eligibility transactions. A nominal-purchase eligibility transaction is one in which a purported financial transaction is generated by the point-of-sale device 112 and transmitted like conventional financial transactions, but treated differently to provide an eligibility transaction. In contrast, an eligibility-verification eligibility transaction is one that uses the basic infrastructure used by financial transactions without duplicating the precise form of financial transactions. Embodiments that use nominal-purchase eligibility transactions may be implemented without any changes to the financial-transaction infrastructure, while the different character of eligibility-verification eligibility transactions generally may require some modification of infrastructures configured exclusively for financial transactions.

In either case, the merchant processor 120 forwards the authorization request to the card processor 128 over the payment network 124 at block 616. The card processor 128 validates the BIN and forwards the authorization request to the card-management system 132 for validation at block 620. As indicated at block 624, the card-management system 132 responds by validating card status and provider information. This is done by accessing information maintained in the card database 136 that defines valid subscriber accounts and by accessing information maintained in the provider database 140 that defines successfully enrolled subscribers. For instance, the account number transmitted by the point-of-sale terminal 112 after extraction from the presentation instrument may be compare with a list of valid account numbers in the card database 136. Similarly, the point-of-sale terminal identifier may be compared with a list of valid identifiers maintained in the provider database. For an eligibility transaction to be confirmed, both comparisons must be made successfully.

A verification of this information confirms the eligibility transaction. The system responds in two ways, indicated by the bifurcated nature of the flow diagram below block 624. The left portion of the diagram shows steps that are performed to provide eligibility information to the provider as a response to the eligibility request, and the right portion of the diagram shows steps that are performed to accommodate the requirements of the financial-transaction portion of the architecture 100. The specific steps taken on the right side may depend on whether the eligibility transaction was a nominal-purchase or an eligibility-verification type of transaction.

It is noted that the functions of the left prong are generally performed only when eligibility has been successfully confirmed. This determination is transmitted to the healthcare-management system 144 at block 628, permitting the healthcare-management system 144 to verify provider and subscriber information at block 632. The eligibility information is retrieved at block 636 and transmitted to the provider at block 636. Examples of different forms of such a response are described below in connection with FIGS. 8A-8F. These responses may be sent by fax or email, perhaps depending on specified preferences of the provider. From the perspective of the provider, the system thus operates by asking a subscriber for his card, swiping in through a terminal, and receiving a fax or email in response that includes eligibility information for that subscriber. This is a convenient mechanism for limitations on services covered by the insurer to be retrieved quickly by the provider.

As indicated by block 640, the functions implemented on the right side of the drawing may differ for nominal-purchase and eligibility-verification transactions. If the transaction is a nominal-purchase transaction, the card-management system generates a decline code at block 644. It is notable that a decline code is generated irrespective of whether the information was validated at block 624, although the decline code may differ depending on the result of that validation. For example, in cases where the information could not be validated, a conventional decline code may be generated that is correlated with the specific reason for denial. In cases where the information was validated, though, the decline code could be a special code that operates as a decline code to the financial-transaction components of the infrastructure 100, but is recognized differently by the provider.

The decline code is transmitted back to the point-of-sale terminal 112 at block 648. If the response code is a regular decline code, as checked at block 652, it signals that the presentation instrument is invalid for eligibility and the provider is notified of that fact by the response shown on the point-of-sale terminal 112. If the decline code is a special code that the provider has been notified is indicative of eligibility, the presentation instrument has been confirmed as valid for eligibility, and the provider checks for a fax or email transmission from the healthcare-management system 144 at block 672 to check the specific eligibility information.

There are a number of alternative arrangements that may be implemented with the nominal-purchase type of eligibility transaction. For instance, instead of returning a decline code, a referral code could be returned. The desirability of such an alternative may depend on the availability of referral codes for certain payment networks 124 and the costs associated with such referral codes. Other embodiments might use a balance-inquiry transaction in lieu of a nominal-purchase transaction with merchant processors 120 that support balance-inquiry transactions. In some alternative embodiments, a transmission is made to the provider by email or fax from the healthcare-management system for both confirmations and failures of the eligibility transaction. In cases where the transaction fails, a specific reason for the failure may be transmitted instead of the requested eligibility information. This has the advantage that providers need not distinguish between decline codes that may be received by the point-of-sale terminal 112, having the ability simply to check for a fax or email transmission as a response to all eligibility requests.

In cases where an eligibility-verification transaction is initiated with a zero transaction amount, a check is made at block 660 whether the transaction is valid at block 660. Such a check is made in accordance with criteria that may not be strictly financial and verifies that the form of the transaction is correct. A decline code or an approval code is generated in accordance with the result of the check. If the code is a decline code, it is returned to the point-of-sale terminal 112 at block 664 via the card processor 128, payment network 124, and merchant processor 120. Receipt of such a decline code by the point-of-sale terminal 112 identifies the presentation instrument as invalid. If the code in an approval code, it is returned to the point-of-sale terminal 112 through the same path at block 668. In some embodiments, receipt of an approval code causes the point-of-sale terminal 112 to print a receipt at block 676 and to include eligibility information on the receipt. In other embodiments, the eligibility information is retrieved by the provider at block 672 from a fax or email transmission as in the other embodiments. In is possible in certain instances for both a receipt to be printed by the point-of-sale system at block 676 and for the provider to retrieve eligibility information by email or fax at block 672.

These types of eligibility transactions have the advantage that a code is always returned to the point-of-sale system 112 that directly indicates the eligibility status of the presentation instrument. The existence of a separately defined eligibility-verification transaction permits differentiation from purely financial transactions, which in turn enables better reporting functionality to be provided in summarizing activity.

In some alternative embodiments, a transmission may be sent by email or fax to the provider from the healthcare management system even when the eligibility-verification transaction is declined. Such a transmission might also include additional details of the reason for the decline to permit the provider to take suitable action beyond the more abbreviated code generally provided to the point-of-sale terminal 112. Furthermore, the use of a different eligibility-verification transaction also permits certain alternative embodiments to include addition fields for the transaction that might be keyed manually at the point-of-sale terminal 112.

In still other alternative embodiments, transmission by the healthcare-management system 144 may be replaced with a portal to dynamic web information. Such an implementation would make use of an account assigned to each of the providers, who would be able to log in and maintain an extended session that shows the results of eligibility requests throughout a defined period of time. Requests that are unread by the provider could be indicated and automatic refreshes of information could be provided as additional requests are made.

Merely by way of example, the web interface may provide a list of eligibility requests received in the course of a business day, with the interface continually providing an updated display. Upon selection of a particular eligibility request, the provider would be prompted to enter a userid/password combination depending on the length of time the display was idle. This acts as a security feature to ensure confidentiality of the information. In response to the request, the healthcare management system 144 would display the eligibility information and record that the request had been made. Options may be included to require that the provider acknowledge having read the eligibility information. Such an arrangement may include mechanisms for allowing the provider to access post eligibility displays, perhaps limited by a period of days or weeks, and to print out eligibility information itself. Analysis features could provide for the generation of summary reports over different time periods, permitting the provider to track trends.

Figure 6:
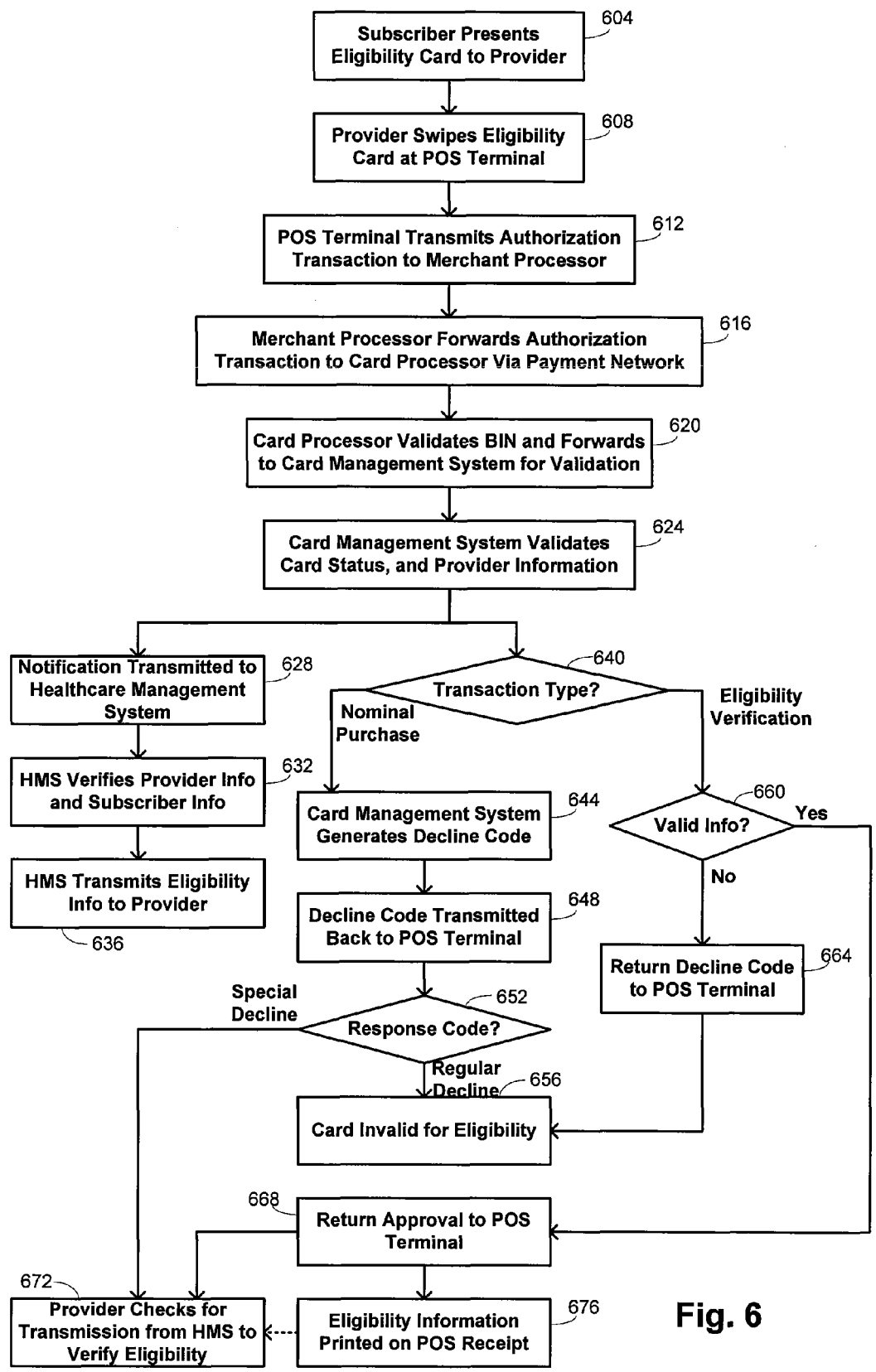
FIG. 6 is a flow diagram summarizing methods of executing eligibility transactions in a variety of embodiments.
Figure 7:
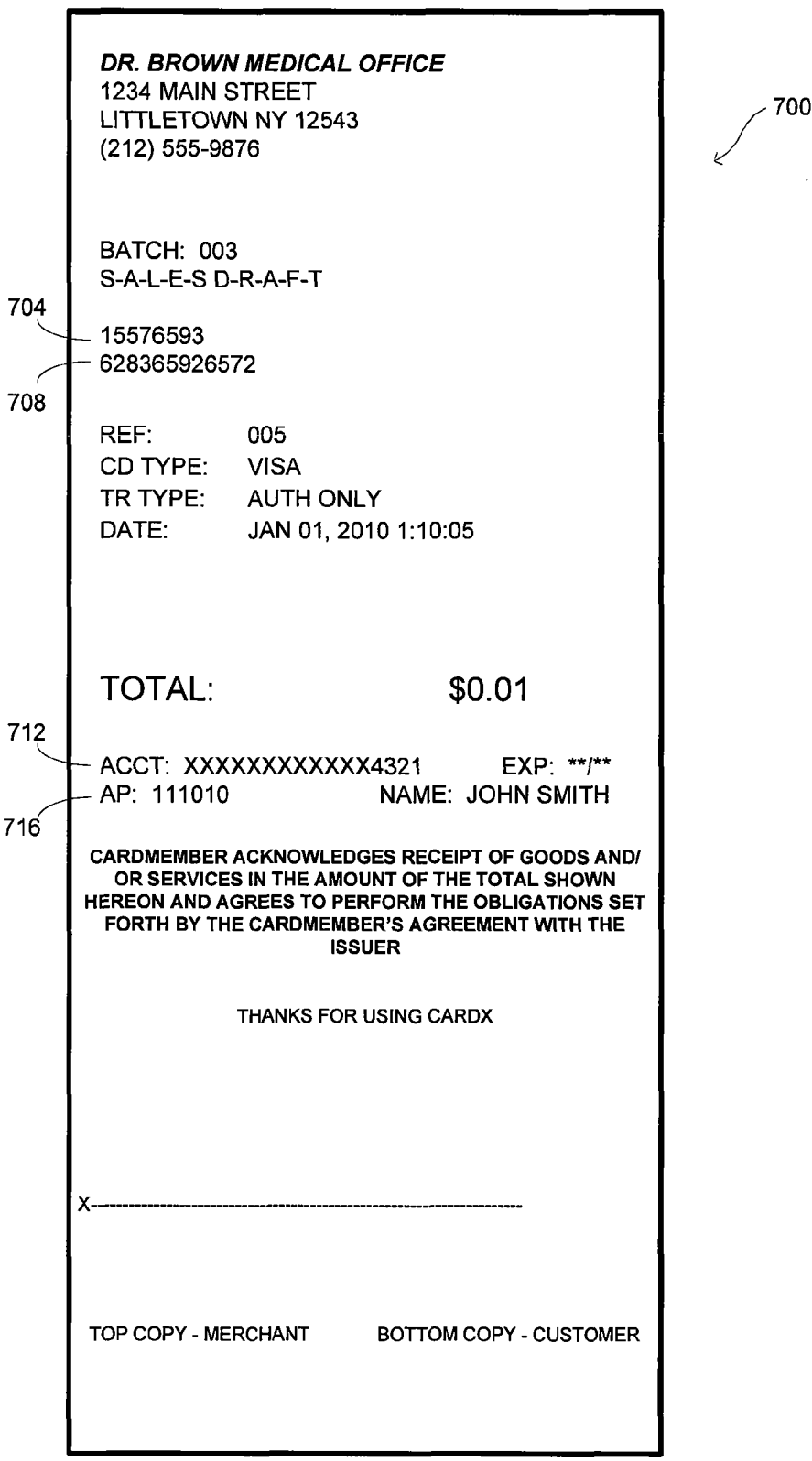
FIG. 7 is an example of a receipt that may be generated at a point-of-sale terminal disposed at a provider location in some embodiments.

FIG. 7 provides an example of a receipt that might be printed by the point-of-sale terminal in an embodiment that implements a separate eligibility-verification transaction, as indicated at block 676 of FIG. 6. This receipt 700 has the same general format as a financial-transaction receipt, in this example resembling a credit-transaction receipt. This reflects the integration of the eligibility-transaction arrangement with a conventional financial-transaction arrangement. Of particular note on this example receipt are the point-of-sale terminal identifier 704 and the merchant identifier 708. The point-of-sale terminal identifier 704 is the unique character string that identifies the particular terminal involved in the processing of the eligibility transaction. The merchant identifier 708 acts in these embodiments to identify the provider.

Also of interest on the receipt 700 are the account number 712 and the approval code 716. The account number 712 is the unique identification of the subscriber account extracted from the track-2 magnetic-stripe data; as is now conventional when printing account numbers on receipts generated as part of a financial transaction, a portion of the account number 712 may be suppressed to avoid identity-theft crimes. In this embodiment, the approval code is identified as such by the "AP" designation, which quickly informs the provider that the eligibility has been verified. The specific content of the approval code 716 may also include relevant information. For instance, in this embodiment, the approval code 716 is generated as a six-digit code with the first three digits identifying approval and the last three digits identifying a copay amount. In this example, the "111" portion of the approval code 716 identifies that the subscriber is eligible for services with that provider and the "010" portion of the approval code identifies that the subscriber is obliged to make at $10 copayment to receive the services.

FIGS. 8A-8F show a variety of different forms of eligibility responses that may be generated in different embodiments for transmission to the provider. The specific formats for these various responses are intended merely to be exemplary; other formats may readily be used in alternative embodiments. The response shown in FIG. 8A may be considered to be a basic response, showing essentially the same information that might be available from the presentation instrument. This information is organized under a customizable header 802 that includes contact information for the insurer. The eligibility information includes a list 804 of individuals currently covered by the subscriber's insurance plan, a representation of the coverage information 806, and a list of copays and deductibles 808. The coverage information 806 may conveniently be displayed in the form of an image of the presentation instrument, and may specify such information as types of services covered (prescription, dental, vision, etc.), provider instructions for plan type (such as for emergency care, hospitalization, etc.), plan-specific requirements (such as for referrals, etc.), and contact information for hospital admissions and various ancillary services.

Figure 8A:
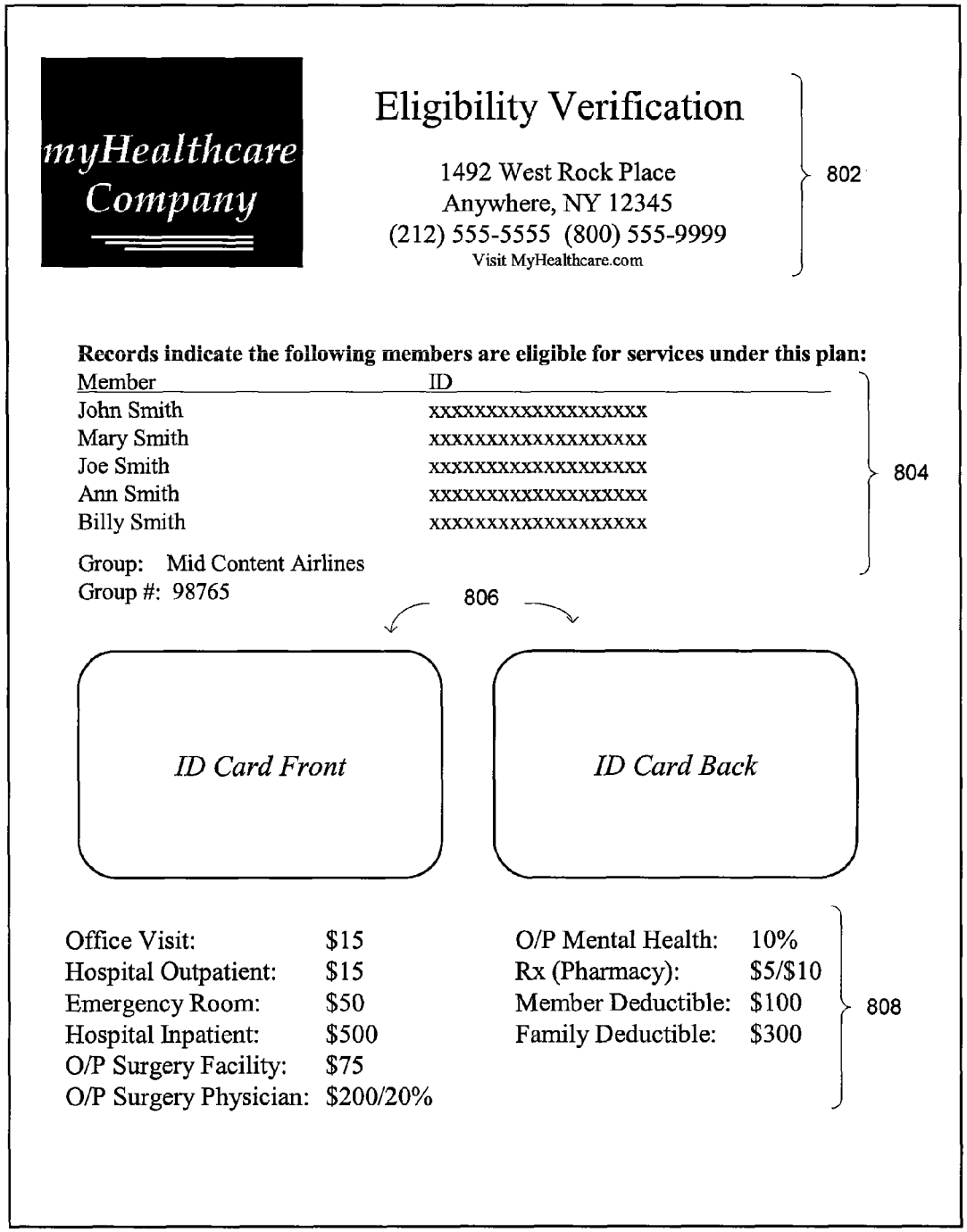
FIGS. 8A-8F are examples responses that may be generated during eligibility transactions in some embodiments.
Figure 8B:

The response shown in FIG. 8B is an example of a dynamic response that includes more detailed plan-specific information. This information is also organized under a customizable header 812, and, like the basic response of FIG. 8A, includes a summary 813 of individuals covered by the plan and a list of copays and deductibles 815. Plan-specific coverage information 814 is provided in the form of specific details and instructions for such activities as precertification, referrals, services that are not covered, and the like. Plan-specific requirements and restrictions 817 are similarly set forth. The content of these two portions of the response may be customizable. A listing of drug formularies 816 may conveniently be included to identify drugs designated as covered under the specific plan.

Figure 8C:

The response shown in FIG. 8C includes similar content to the dynamic response of FIG. 8B, but additionally includes information specific to the provider location. Like the other responses, the information is organized under a customizable header 322, and includes a summary 823 of covered individuals, a list of copays and deductibles 825, and a drug formulary 828. In addition provider identification information 824 is included, specifying such details as contact information for the provider(s) and specializations of the provider(s). Plan-specific coverage information 826 and provider-specialty-specific information 827 may be include. A variety of plan-specific requirements and restrictions 829 may also be summarized so that the combination of plan-specific and provider-location-specific information details coverage and guidelines for the plan as a whole and as related to particular specialties.

Figure 8D:

The response shown in FIG. 8D includes individualized deductible information. Organized under a customizable header 832, the response includes a summary 833 of covered individuals, a list of copays 835, and a summary of plan-specific coverage information 834. In this embodiment, this information is supplemented with deductible information 836 that provides deductible limits and a specification of amounts for each member covered by the plan. This information may be categorized according to how the plan deductibles apply, such as by providing a determination of individual and family deductible amounts. This information may be useful to the provider in determining the actual cost of services to the subscriber.

Figure 8E:

The response shown in FIG. 8E is similar in that a summary 843 of covered individuals, a list of copays 845, a summary of plan-specific coverage information 844, and deductible information 846 are organized under a customizable header 842. In addition, payment-option information 847 is included to show funds that may be available for specific services. In the example, these funding sources include flexible spending accounts and a credit line, although other funding sources like health savings accounts may additionally be specified in such an embodiment.

Figure 8F:

Finally, the response shown in FIG. 8F is an example of a result of an "intelligent" eligibility response, with the content being determined from such supplementary information as formulary information, rider information, ancillary-coverage information, and the like. In the illustration, a summary 853 of covered individuals, a list of copays and deductibles 855, formulary information 858, and plan-specific coverage 856 and requirement/restriction information 857 are organized under a customizable header 852. This is supplemented with specific instructions 854 to the member, making the response suitable as a subscriber handout. Such a response thus provides a particularly convenient mechanism for providing updated eligibility information to subscribers, using the provider as an intermediary.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of providing eligibility information to a service provider, the method comprising:
   receiving registration information over a financial network from a point-of-sale terminal, the registration information including a first identifier associated with the point-of-sale terminal and an identification of the service provider;
   associating the first identifier with information identifying a device disposed at a location of the service provider in a database, wherein the device is different from the point-of-sale terminal;
   establishing a communication path to the device with the information identifying the device;
   transmitting a confirmation of registration of the point-of-sale terminal to the device over the communication path;
   receiving an authorization request over the financial network from the point-of-sale terminal, the authorization request including the first identifier and a second identifier associated with a subscriber;

determining an authorization transaction type based on the authorization request, the authorization transaction type indicating whether the transaction is a nominal purchase or an eligibility verification;

retrieving the eligibility information from a data store using the second identifier, wherein the eligibility information indicates eligibility of the subscriber to receive a service from the service provider in accordance with a policy of a third party different from the service provider and different from the subscriber, the retrieving the eligibility information based on the determined authorization transaction type; and transmitting the eligibility information to the service provider.

2. The method recited in claim 1 wherein the financial network comprises an ATM network.

3. The method recited in claim 1 wherein a portion of the registration information that includes the identification of the service provider was extracted from a registration instrument read by the point-of-sale terminal.

4. The method recited in claim 3 wherein the registration instrument comprises a magnetic-stripe card.

5. The method recited in claim 1 further comprising establishing a web site for managing eligibility information for the service provider with secure access by the service provider using the registration information.

6. The method recited in claim 1 wherein the device comprises a fax machine and the communication path includes the public-telephone switch network.

7. The method recited in claim 1 wherein the device comprises a computational device and the communication path includes the Internet.

8. The method recited in claim 1 wherein transmitting the eligibility information to the service provider comprises transmitting a response to the authorization request over the financial network to the point-of-sale terminal.

9. The method recited in claim 8 wherein:
the authorization request further includes a nominal transaction amount; and
the response comprises a decline code that indicates a refusal of the authorization request.

10. The method recited in claim 8 wherein:
the authorization request further includes a zero transaction amount; and
the response comprises an approval code that indicates an approval of the authorization request.

11. The method recited in claim 1 wherein transmitting the eligibility information to the service provider comprises:
retrieving the information identifying the device from the database;
establishing a second communication path to the device with the information identifying the device; and
transmitting the eligibility information over the second communication path to the device.

12. The method recited in claim 1 wherein the service provider is a healthcare provider and the third party is an insurer.

13. The method recited in claim 1 wherein the second identifier comprises an identifier extracted from a presentation instrument issued to the subscriber.

14. The method recited in claim 13 wherein the presentation instrument comprises a magnetic-stripe card.

15. A method of providing eligibility information to a healthcare provider, the eligibility information indicating eligibility of a subscriber to receive a service from the healthcare provider in accordance with a policy of an insurer, the method comprising:

receiving registration information over an ATM network from a point-of-sale terminal, the registration information including a first identifier associated with the point-of-sale terminal and an identification of the healthcare provider, wherein the registration information was extracted from a magnetic-stripe registration card read by the point-of-sale terminal;

associating the first identifier with information identifying a fax machine or computer disposed at a location of the healthcare provider in a database;

establishing a communication path to the fax machine or computer with the information identifying the fax machine or computer;

transmitting a confirmation of registration of the point-of-sale terminal to the fax machine or computer over the communication path;

receiving an authorization request over the ATM network from the point-of-sale terminal, the authorization request including the first identifier and a second identifier associated with the subscriber, wherein the second identifier comprises an identifier extracted from a magnetic-stripe card issued to the subscriber;

determining an authorization transaction type based on the authorization request, the authorization transaction type indicating whether the transaction is a nominal purchase or an eligibility verification;

retrieving the eligibility information from a data store using the second identifier, the retrieving the eligibility information based on the determined authorization transaction type;

retrieving the information identifying the fax machine or computer from the database;

establishing a second communication path to the fax machine or computer with the information identifying the fax machine or computer;

transmitting the eligibility information over the second communication path to the fax machine or computer; and transmitting a response to the authorization request over the ATM network to the point-of-sale terminal.

16. A system for providing eligibility information to a healthcare provider, the system comprising:
a communications device coupled with an ATM network;
a processor;
a storage device;
a memory coupled with the processor, the memory comprising a computer-readable medium having a computer-readable program embodied therein for directing operation of the system, the computer-readable program including:
instructions for receiving registration information with the communications device over the ATM network from a point-of-sale terminal, the registration information including a first identifier associated with the point-of-sale terminal and an identification of the healthcare provider;
instructions for associating the first identifier with information identifying a fax machine or computer disposed at a location of the healthcare provider on the storage device;
instructions for establishing a communication path from the communications device to the fax machine or computer with the information identifying the fax machine or computer;

instructions for transmitting a confirmation of registration of the point-of-sale terminal to the fax machine or computer over the communication path with the communications device;

instructions for receiving an authorization request with the communications device over the ATM network from the point-of-sale terminal, the authorization request including the first identifier and a second identifier associated with a subscriber;

instructions for determining an authorization transaction type based on the authorization request, the authorization transaction type indicating whether the transaction is a nominal purchase or an eligibility verification;

instructions for retrieving eligibility information from the storage device using the second identifier, wherein the eligibility information indicates eligibility of the subscriber to receive a service from the healthcare provider in accordance with a policy of an insurer, the retrieving eligibility information based on the determined authorization transaction type; and instructions for transmitting the eligibility information to the healthcare provider with the communications device.

17. The system recited in claim 16 wherein a portion of the registration information that includes the identification of the healthcare provider was extracted from a registration instrument read by the point-of-sale terminal.

18. The system recited in claim 17 wherein the registration instrument comprises a magnetic-stripe card.

19. The system recited in claim 16 wherein the computer-readable program further includes instructions establishing a web site for managing eligibility information for the healthcare provider with secure access by the healthcare provider using the registration information.

20. The system recited in claim 16 wherein the instructions for transmitting the eligibility information to the healthcare provider comprise instructions for transmitting a response to the authorization request over the ATM network to the point-of-sale terminal.

21. The system recited in claim 20 wherein:
the authorization request flirt her includes a nominal transaction amount; and
the response comprises a decline code that indicates a refusal of the authorization request.

22. The system recited in claim 20 wherein:
the authorization request further includes a zero transaction amount; and
the response comprises an approval code that indicates an approval of the authorization request.

23. The system recited in claim 16 wherein the instructions for transmitting the eligibility information to the healthcare provider comprise:
instructions for retrieving the information identifying the fax machine or computer from the storage device;
instructions for establishing a second communication path from the communications device to the fax machine or computer with the information identifying the fax machine or computer; and
instructions for transmitting the eligibility information over the second communication path to the fax machine or computer with the communications device.

24. The system recited in claim 16 wherein the second identifier comprises an identifier extracted from a presentation instrument issued to the subscriber.

* * * * *